Patented Dec. 12, 1922.

1,438,188

UNITED STATES PATENT OFFICE.

TAINE G. McDOUGAL AND SAMUEL J. McDOWELL, OF FLINT, MICHIGAN, ASSIGNORS TO CHAMPION IGNITION COMPANY, OF FLINT, MICHIGAN, A CORPORATION OF MICHIGAN.

SYNTHETIC-JEWEL BEARING.

No Drawing. Original application filed January 14, 1920, Serial No. 351,438. Divided and this application filed February 10, 1922. Serial No. 535,647.

*To all whom it may concern:*

Be it known that we, TAINE G. McDOUGAL and SAMUEL J. McDOWELL, citizens of the United States, and residents of Flint, county of Genesee, and State of Michigan, have invented certain new and useful Improvements in Synthetic-Jewel Bearings, of which the following is a full, clear, concise, and exact description, such as will enable others skilled in the art to which the invention relates to make and use the same.

The present invention relates to jewel bearings such as are adapted for use in speedometers and other instruments, the object being both to improve the quality of the bearing and to materially reduce its cost. In other words, the invention is concerned with a process of manufacture as well as with the bearing itself. Claims on the process of manufacture are embodied in our application for United States Patent Serial No. 351,438, filed January 14, 1920, now Patent No. 1,422,216 of which the present application is a division; but it is deemed advisable, in order that the invention as a whole may be best understood, to describe in the present application both the article and the several steps with which its manufacture, as involved in the preferred practice, may be divided.

1st. The formation of a glass of a highly viscous nature when fused which serves as the base from which the bearings are made and which allows a better control of the shrinkage (that results from subsequent treatment) than could otherwise be obtained with the raw ingredient or ingredients composing the glass batch This glass may be formed of various materials or combinations of materials, but it is fundamentally important to the success of the process that it be very viscous when fused, since a bearing of such material will retain its shape during the burning or hardening process and will moreover present a smooth surface such as avoids any necessity for polishing subsequently to the heat treating operation. Manifestly, this glass should also be of a very hard nature when cooled to normal temperature. One form of such glass may be made from raw pulverized feldspar (mined as a crystalline rock and ground to pass a screen of say one hundred meshes to the inch) as it is commonly prepared for the pottery trade, but it is desirable to add a hardening material, preferably about twenty per cent of clay. Feldspar alone melts at about 1250° C., but for the incorporation of clay therewith by fusion a much higher temperature, namely, about 1400° C., is necessary. This temperature is also much higher than is subsequently used in fusing the bearing shapes.

2nd. The glass or pre-melted material so formed is ground to a very fine powder, which may be accomplished in any desired manner.

3rd. After grinding, the powder is granulated by dampening with a solution of dextrin or other suitable binding material and is then preferably rubbed through a rather coarse screen (say sixty meshes to the inch) while in this damp condition. This step is the first one that would be necessary should raw feldspar, as ground for the pottery trade, be used.

4th. The granulated material is then dried and preferably screened to remove all particles too large or too small, as, for example, by being passed through a screen of sixty meshes per inch and also through a screen of one hundred fifty meshes per inch so that the material finally retained is of a quite uniform size and small enough to permit free flow into the dies or press.

5th. The dry granulated material thus formed is then fed into suitable hardened dies whereby it is compressed and properly shaped; and in order to reduce the wear on the dies, a small amount of kerosene or the like is preferably mixed with the powder for lubricating purposes.

6th. After being discharged or removed from the press, the shapes or pellets, which are ordinarily of ring formation, are then received or placed in refractory trays, the bottoms of which are covered with a layer of finely divided powder of some material, preferably aluminum oxide, which forms a bed therefor and which will not adhere to the jewels or chemically combine therewith during the firing or fusing process. The jewels are thus free to shrink and do not become fused with the powder or attached thereto.

7th. The shapes are next heated to cause fusion, said treatment being arrested at a point such as to give the size desired and to insure the finish or polish necessary to insure a bearing with minimum friction. In this operation the material is heated sufficiently to cause what is technically called fusion but not sufficiently to cause deformation, the actual temperature being dependent somewhat on the particular material used, and being determined by two considerations, namely, the formation of a satisfactory fused surface, and, second, the retention of the shape to which the pellet or ring was originally compressed. If the heating is too low, the surface will be rough, and if the heating is too high the bearing will be deformed. The bearings are then annealed or slowly cooled.

When it is desired to imitate natural jewel bearings, a sufficient amount of coloring matter is introduced into the mixture from which the glass is originally made, or to the granulated material.

As a modification of the process heretofore outlined, it is preferred in some instances to form the constituent material or base in two separate batches, one of which has a less tendency to deform than the other, that is, is more viscous when heated to the same temperature, for example, one batch may be of the feldspar-clay glass heretofore described, whereas the other, or second, batch may be of the lower-fusing pure feldspar. The die is then partly filled with material of the first batch which is compressed or partly so by a stroke of the die, whereupon additional material of the second batch is fed in and subsequently compressed upon the body first formed to thereby complete the pellet or shape. When the bearings thus produced are fired or baked the thin veneer of the second material fuses more readily than the body, thus resulting in a facing which is better glazed than the body and which presents a smoother surface after heat treatment as previously described. The body remaining more rigid on account of its greater viscosity or higher fusibility or deformation point, lends stability to the whole pellet.

The invention further comprises the production of bearings as heretofore described whether or not formed from premelted glass, that is, they may be formed from a non-fused base of substantially the same raw material or materials, screened, granulated, compressed and heat-treated (without pre-melting) in the manner outlined above, but the resultant articles are more subject to shrinkage and otherwise less desirable than when formed in the preferred manner heretofore stated.

We claim:

1. A jewel bearing or the like formed from powdered glass, essentially of high viscosity when fused, compressed into a pallet and subsequently fused and annealed.

2. A ring-shaped bearing shaped by compression of powdered material, capable of forming a glass of high viscosity when hot and hardness when cool, and subsequently fused without material distortion from the shape imparted by said compression.

3. An annular bearing of fused ceramic material formed of a mixture of feldspar and clay.

4. An annular bearing of fused ceramic material in which feldspar is used to the extent of substantially sixty percent or more.

In testimony whereof we affix our signatures.

TAINE G. McDOUGAL.
SAMUEL J. McDOWELL.